Figure 1:
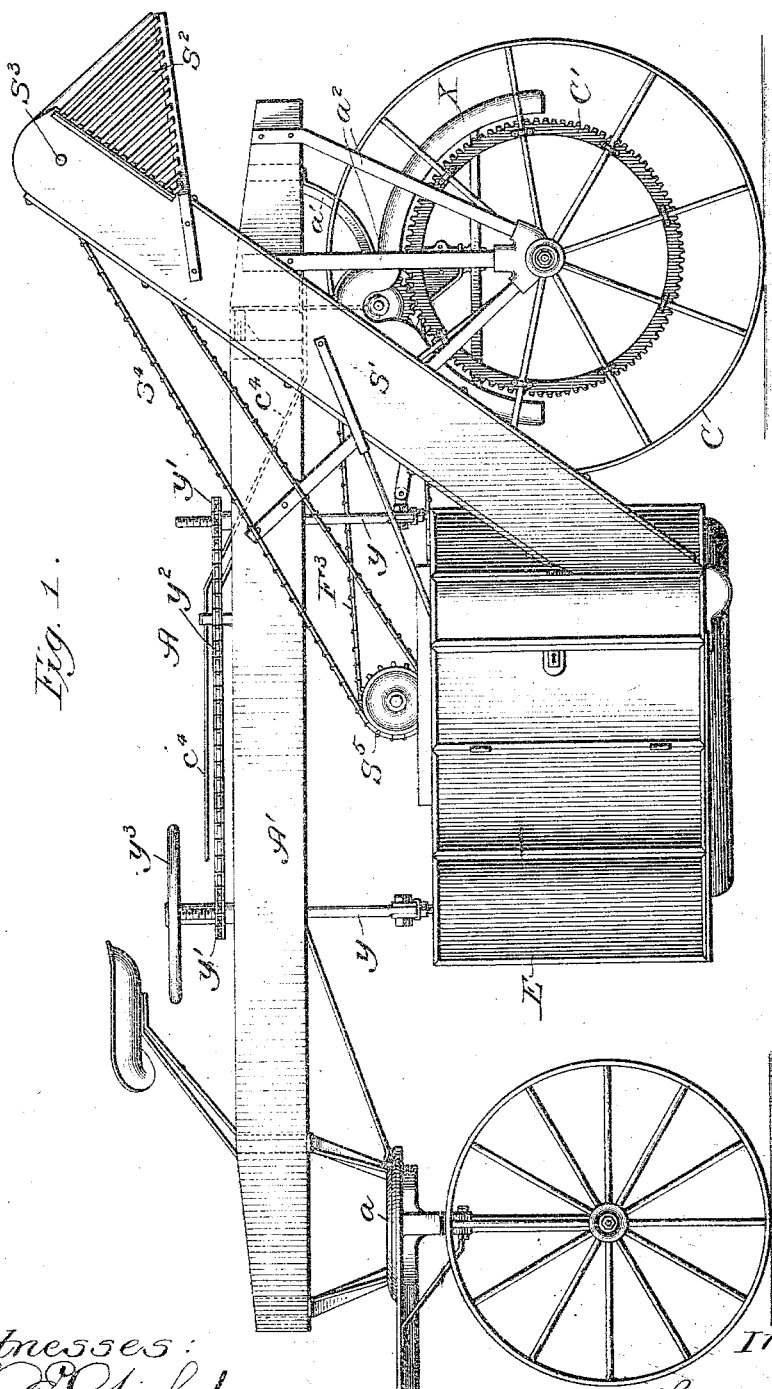

No. 685,440. Patented Oct. 29, 1901.
A. CAMPBELL.
COTTON HARVESTER.
(Application filed Apr. 15, 1901.)
(No Model.) 9 Sheets—Sheet 1.

Witnesses:
Inventor:
Angus Campbell,
By Dyrenforth, Dyrenforth & Lee,
Attys.

No. 685,440. Patented Oct. 29, 1901.
A. CAMPBELL.
COTTON HARVESTER.
(Application filed Apr. 15, 1901.)

(No Model.) 9 Sheets—Sheet 7.

No. 685,440. Patented Oct. 29, 1901.
A. CAMPBELL.
COTTON HARVESTER.
(Application filed Apr. 15, 1901.)
(No Model.) 9 Sheets—Sheet 8.

Witnesses:
Inventor:
Angus Campbell,

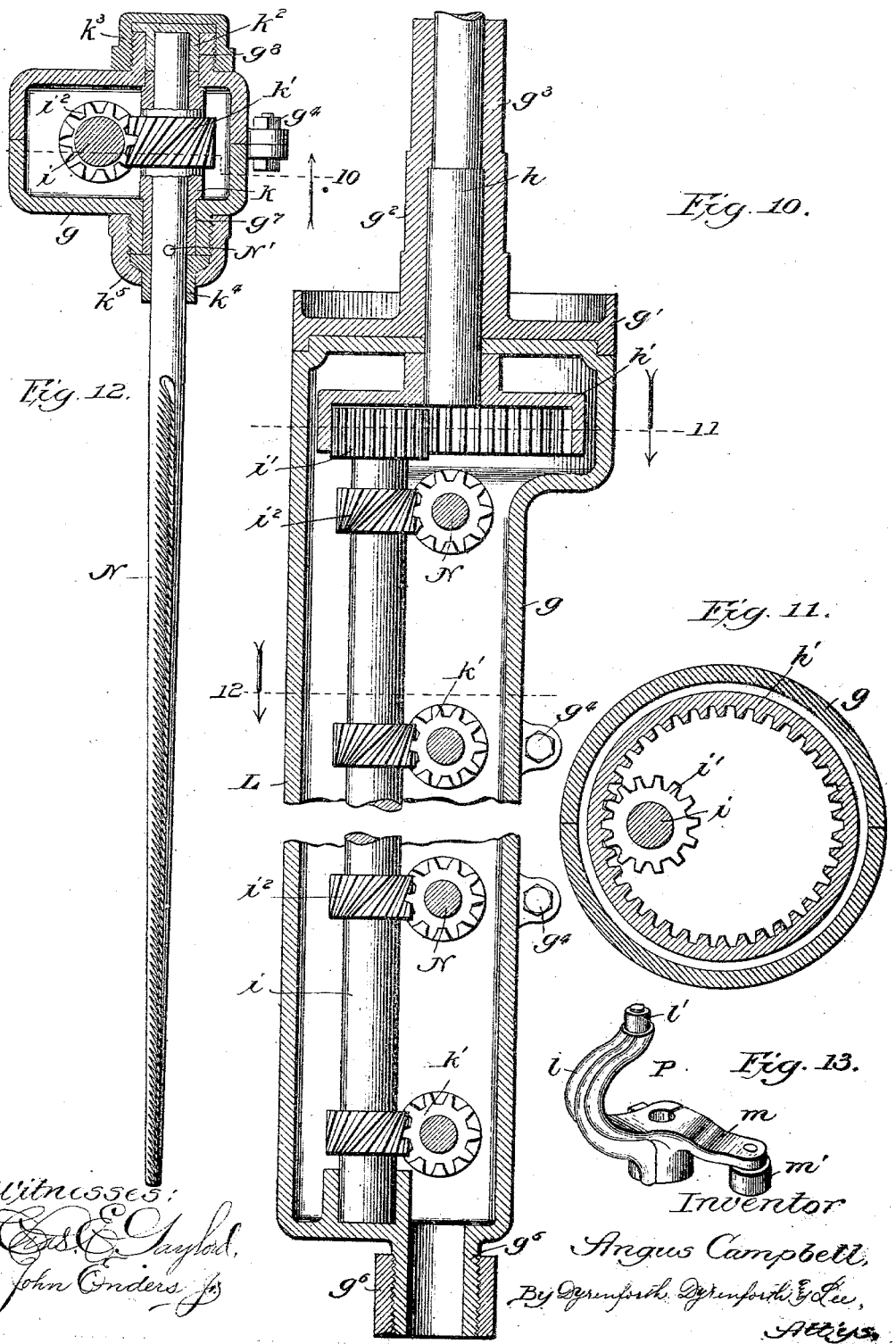

UNITED STATES PATENT OFFICE.

ANGUS CAMPBELL, OF PITTSBURG, PENNSYLVANIA, ASSIGNOR TO AMERICAN COTTON PICKER COMPANY, OF PITTSBURG, PENNSYLVANIA, A CORPORATION OF PENNSYLVANIA.

COTTON-HARVESTER.

SPECIFICATION forming part of Letters Patent No. 685,440, dated October 29, 1901.

Application filed April 15, 1901. Serial No. 55,888. (No model.)

*To all whom it may concern:*

Be it known that I, ANGUS CAMPBELL, a citizen of the United States, residing at Pittsburg, in the county of Allegheny and State of Pennsylvania, have invented a new and useful Improvement in Cotton-Harvesters, of which the following is a specification.

My invention relates to improvements in cotton-harvesters generally, and is more especially in the nature of an improvement upon a machine for the same purpose for which Letters Patent were granted to me July 16, 1895, No. 542,794. In this machine are employed two casings with a longitudinal passage between them to pass on opposite sides of a row of cotton-plants in the field. The casings contain each a large number of picker stems or spindles mounted in endless series of carriers. The carriers for the picker-stems travel endless courses oblong in the direction of the length of the machine and practically straight-sided and parallel at the said longitudinal passage. The speed of travel of the carriers and consequent movement of the rotating picker-stems in the backward direction is approximately equal to the speed of the forward travel of the machine, whereby while the stems are in the plants they rotate in a position approximately stationary with relation to the plants. Each series of carriers as it moves is translated around two centers located, respectively, in the forward and rear end portions of the casing, the translations being such that the picker-stems are thrust longitudinally into the plants, caused to remain therein while pursuing the backward course, and then withdrawn longitudinally from the plants. The principal purpose of my aforesaid patent was to provide mechanism which would operate to thrust the picker-stems longitudinally into the plants to intermesh with similarly-operated picker-stems thrust into the plants from the opposite side, then cause all the said picker-stems to remain and rotate in the plants for a prolonged period to gather the cotton from the open bolls and remain during such prolonged period in a position approximately stationary with the plants to avoid their knocking off green bolls, and then withdraw them longitudinally from the plants without material lateral play to prevent injury to the plants. When the picker-stems are withdrawn from the plants, they are drawn longitudinally through stripper mechanisms which remove the cotton from the picker-stems and cause it to drop to elevators, which deposit it in bags or some other form of receptacle at the rear of the machine.

My present cotton-harvesting machine, so far as its principal features of construction and operation are concerned, is substantially like my said patented machine, but involves improvements in a number of details which experience in the cotton-field has shown to be advisable or expedient.

The drawings show my machine with the improvements forming the subject-matter of the present application.

Figure 2:
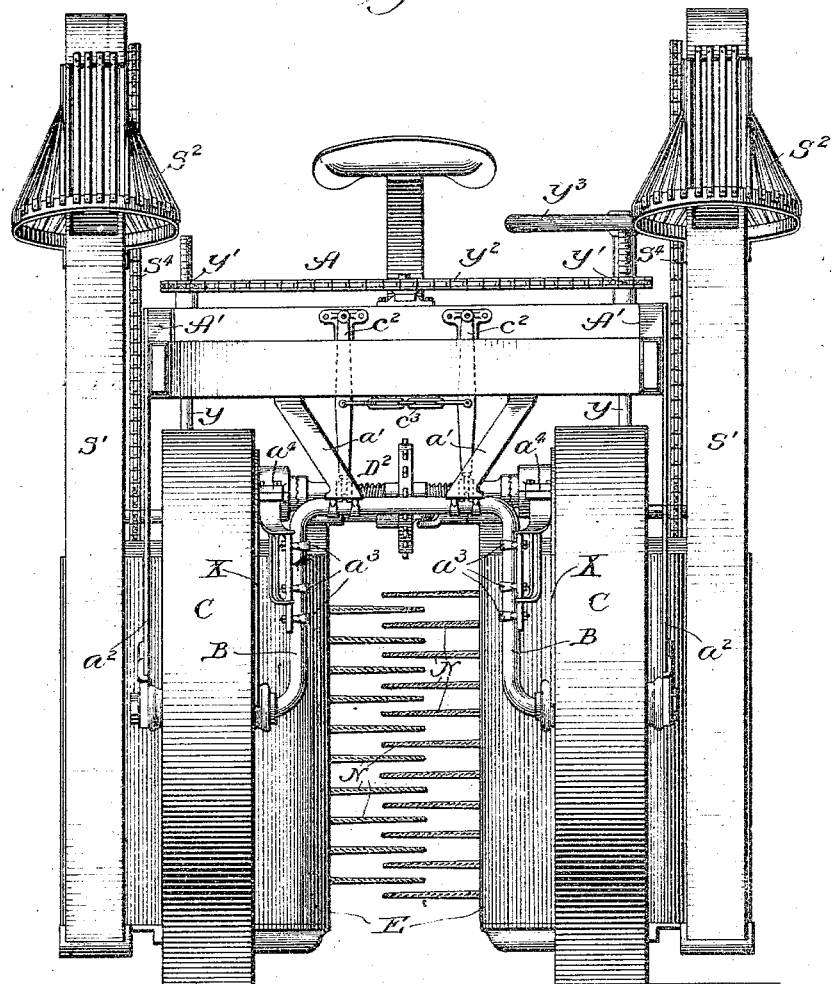
Figure 3:
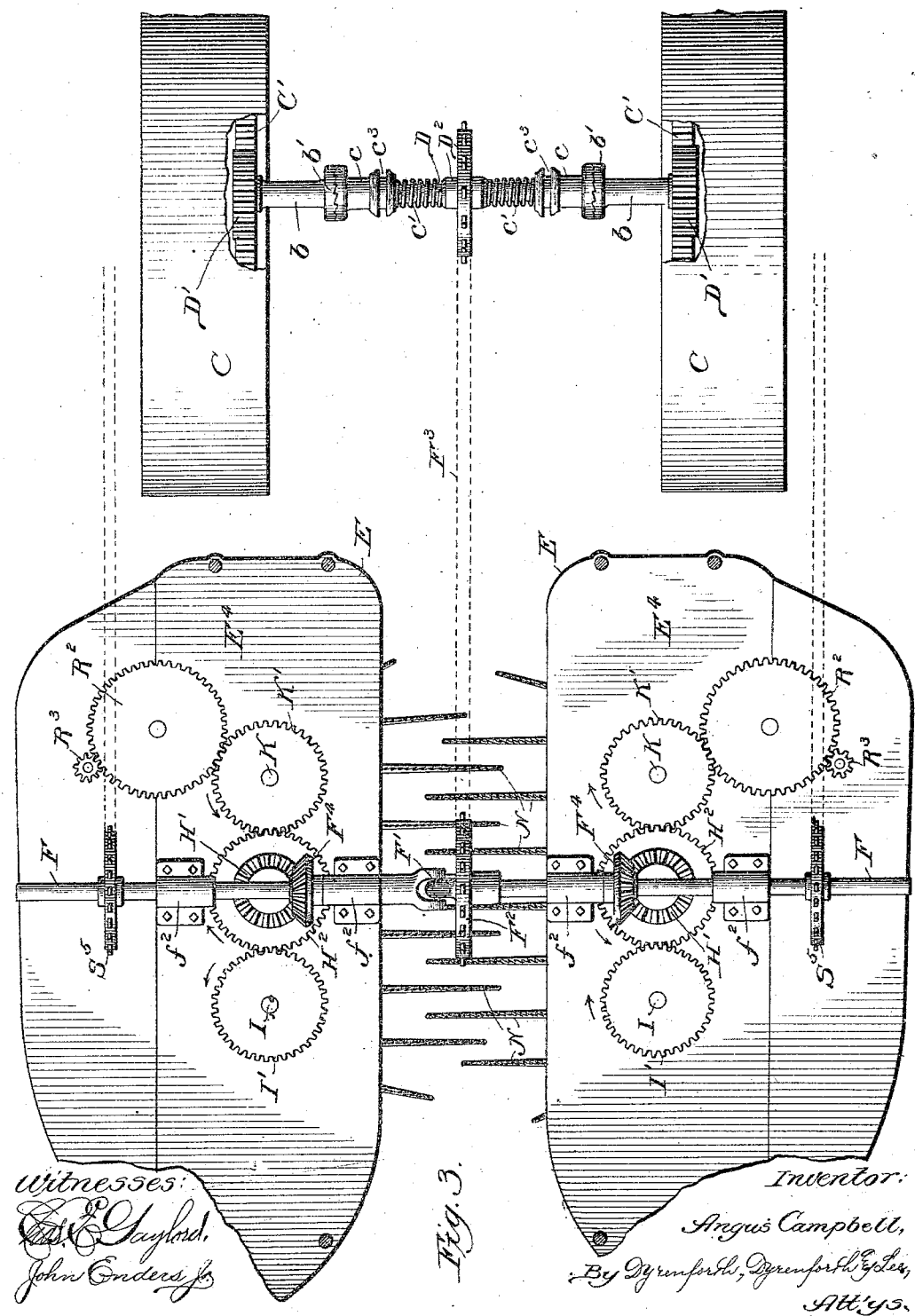
Figure 4:
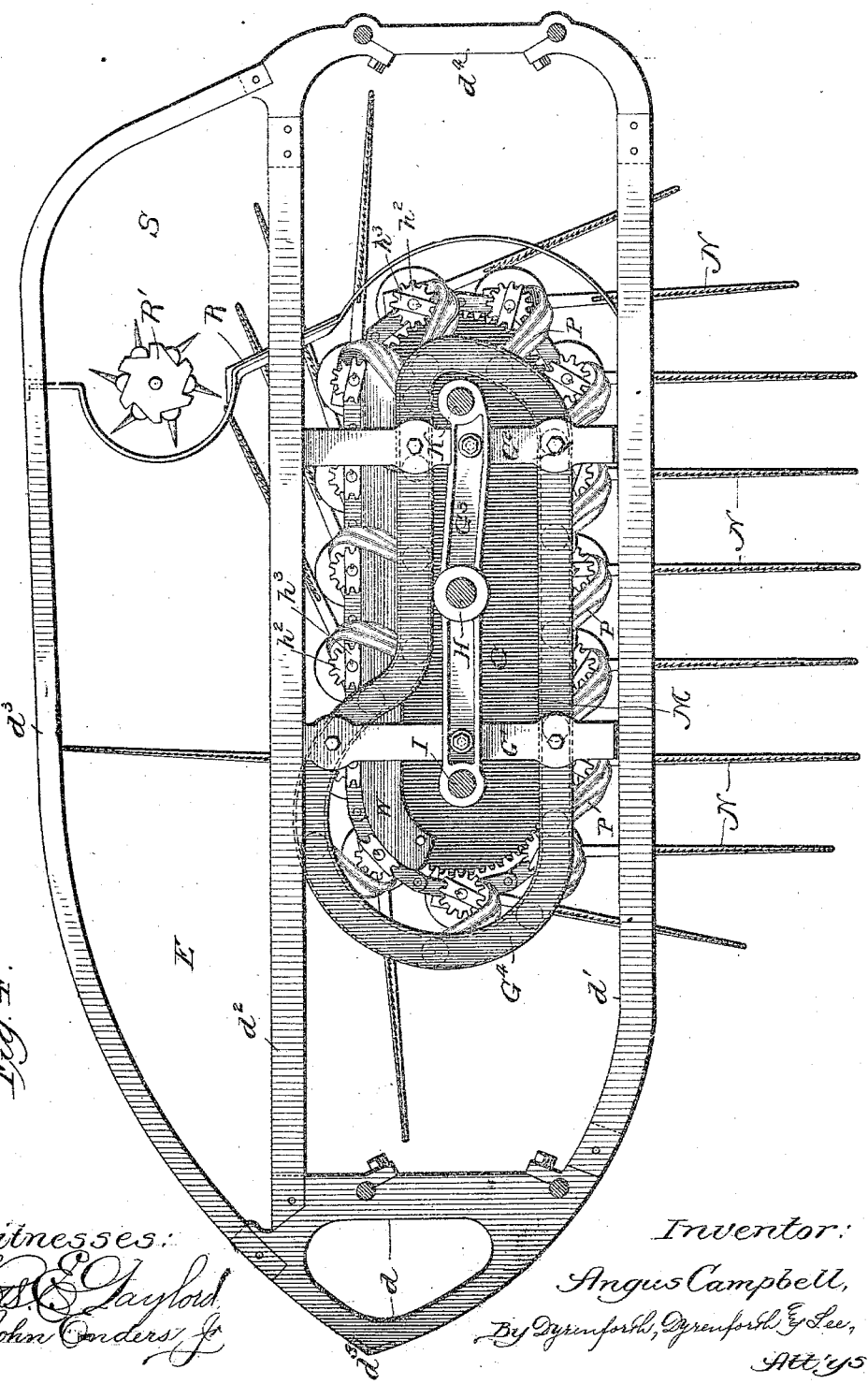
Figure 5:
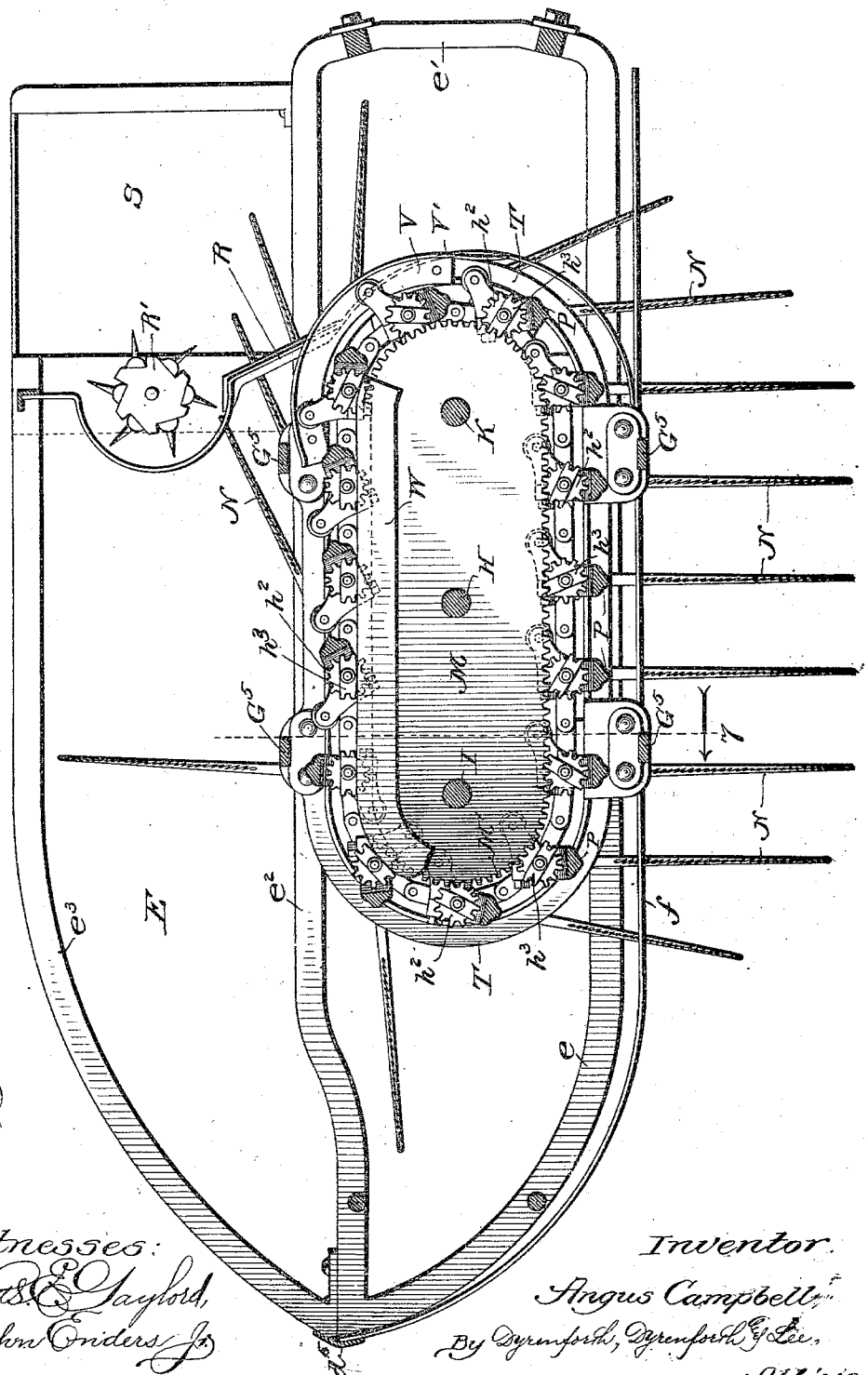
Figure 6:
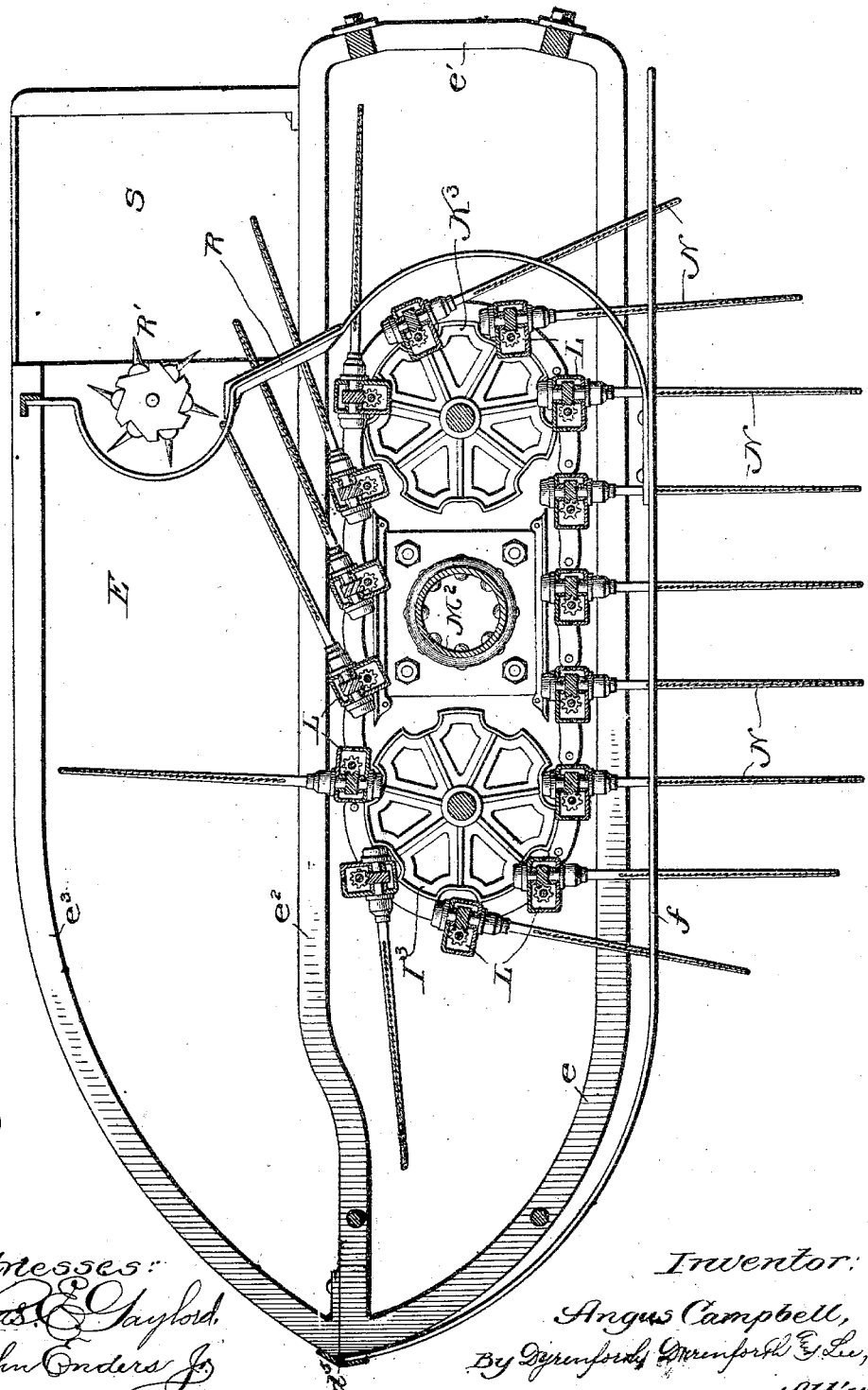
Figure 7:
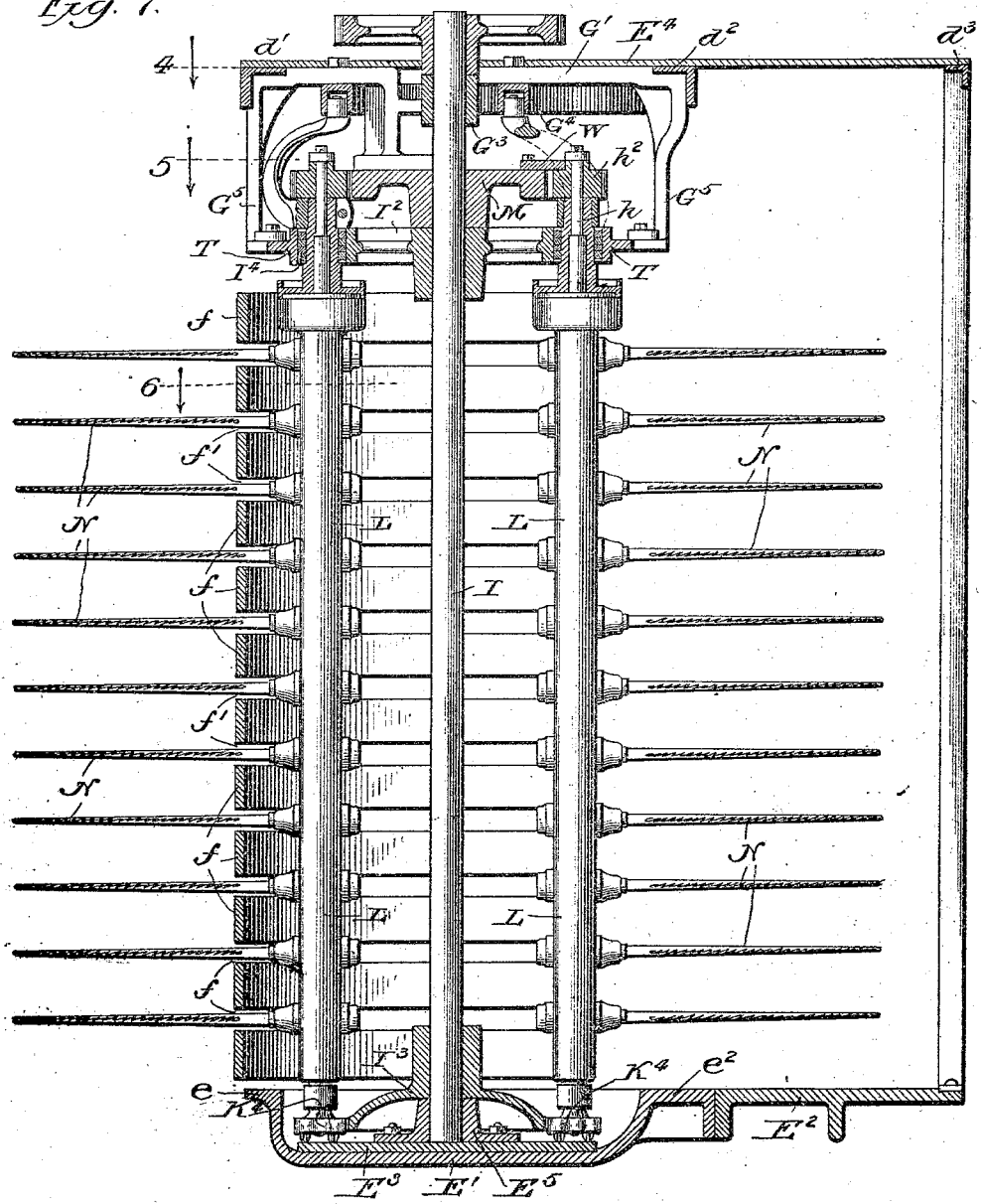
Figure 8:
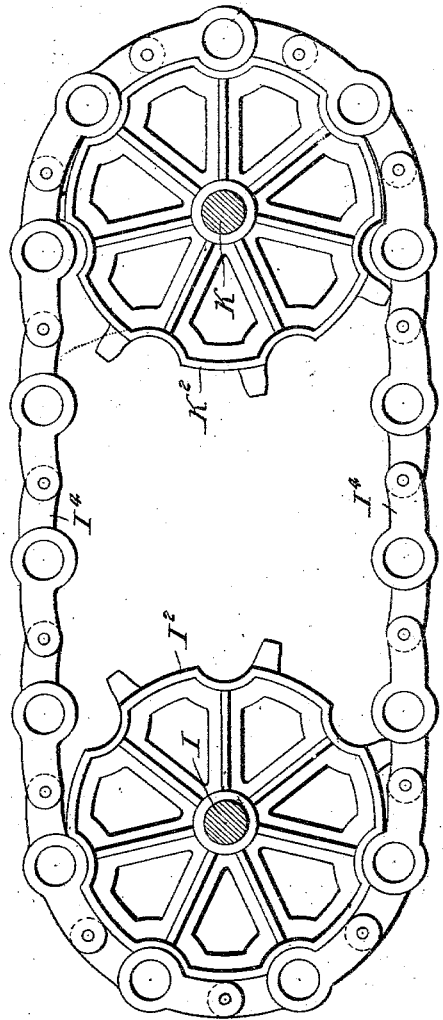
Figure 9:
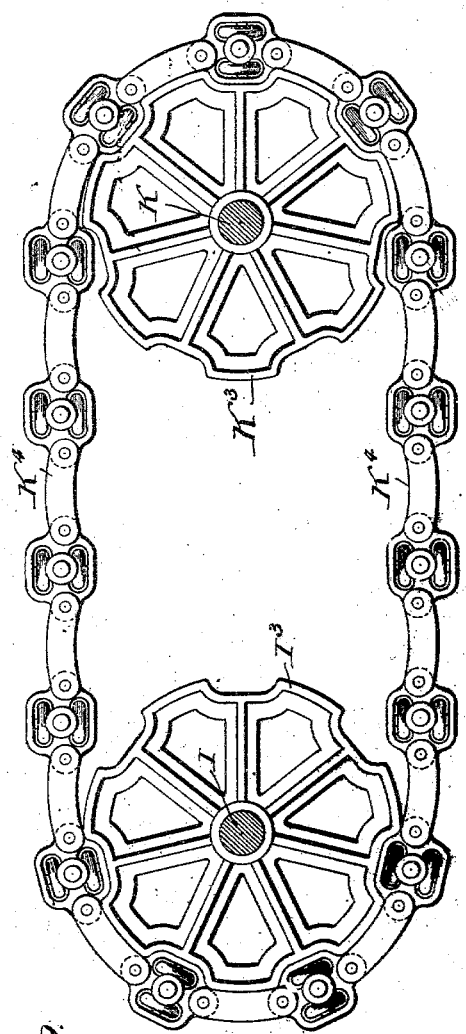

Referring to the drawings, Figure 1 is a side elevation of the machine; Fig. 2, a rear elevation; Fig. 3, a broken top plan view of the main driving mechanism and the casings which contain the picking and stripping devices, with the main frame of the machine left out; Fig. 4, a horizontal section through one of the said casings at the upper side thereof, the section being taken on line 4 in Fig. 7; Fig. 5, a plan section in a lower plane than Fig. 4 on line 5 in Fig. 7; Fig. 6, a plan section in a still lower plane on line 6 in Fig. 7; Fig. 7, a vertical section taken on line 7 in Fig. 5 and viewed in the direction of the arrow; Fig. 8, a plan view of upper sprocket-wheels and a drive-chain which moves the spindle-carriers; Fig. 9, a plan view of lower sprocket-wheels and drive-chain for the spindle-carriers; Fig. 10, a broken vertical section through one of the spindle-carriers; Fig. 11, a section on line 11 in Fig. 10; Fig. 12, a section on line 12 in Fig. 10, showing one of the picker spindles or stems and its rotating means; and Fig. 13, a perspective view of a device or casting at the top of each carrier, presenting cam-engaging arms for steadying and for controlling the axial movement of the spindle-carriers.

A is the main frame of the machine, which is formed of side bars A' and cross-bars properly braced to render the frame rigid. At the forward end the frame is mounted upon a fifth-wheel $a$ on the axle of the front wheels, and the rear end of the frame is provided on opposite sides with brackets $a^2$, which at their lower ends are connected with the rear axle B. Both the front and rear axles are bent upward between the wheels to override cotton-plants. The rear wheels C are journaled upon the axle B, as shown, and are provided on their inner sides with large gear-wheels C', which may be fastened to the spokes, as shown, or secured in place in any other desirable way. The upper horizontal part of the axle B is steadied by brackets $a'$, extending downward from the main frame. Fastened by means of clips $a^3$ to the axle B are brackets $a^4$, carrying journal boxes or bearings for a first drive-shaft E. These bearings may be provided in any suitable way, as part of the said brackets or otherwise, so long as they are rigid with relation to the frame. On opposite ends of the shaft D are pinions D', meshing with the gear-wheels C'. The pinions are integral with sleeves $b$, which extend through the journals $a^4$. The shaft D extends loosely through the sleeves, and the latter are formed with clutch members $b'$. Feathered upon the shaft are clutch members $c$, which may slide longitudinally. Fastened upon the center of the shaft D is a sprocket-wheel $D^2$, and confined between the hub of the sprocket-wheel and the sliding clutch members are springs $c'$, which tend to hold the clutch members in engagement, whereby rotation of the pinions D' will rotate the shaft and sprocket-wheel $D^2$. Pivoted upon a cross-bar of the frame (see Fig. 2) are swinging clutch-shipping levers $c^2$, which at their lower ends enter grooves in the sliding clutch members. The levers $c^2$ are connected between their ends by a chain $c^3$, which chain between its ends is fastened to a clutch-operating lever $c^4$. This lever extends along the top of the machine (see Fig. 1) to a point convenient to the driver's seat. The lever $c^4$ is pivoted between ends and in its movement from normal position draws upon the chain $c^3$ to swing the levers $c^2$ in the direction of each other and move the clutch members $c$ against the resistance of the springs $c'$ out of engagement with the clutch members $b'$, whereby the shaft D is disengaged from the pinions D'. E E are chambers or casings forming housings for the spindle-carriers and receptacles for the gathered cotton, as hereinafter described. The casings are formed exactly alike, except, of course, that one is adapted to the right-hand side and the other to the left-hand side of the machine. An explanation of one of the casings and its contents will therefore answer for the other as well. The frame of the casing is constructed of angle-iron bars to render it as light as possible consistent with the strength and durability required. The top portion of each casing-frame is formed with a toe or point plate $d$, to which are firmly secured the backward-extending bars $d'$ $d^2$ $d^3$, the rear end of this frame being formed with a bar $d^4$. The bottom frame of the casing may consist of a base-plate E', presenting the inner side bar or edge $e$, rear end bar or edge $e'$, and inner bar or edge $e^2$. Fastened, as shown, to the bar or edge $e^2$ is the outer side bar $e^3$. Upright brace-bars extend between the upper and lower sections of the frame to form a rigid structure. The point of the casing is strengthened by a vertically-extending shoe-plate $d^5$, fastened to the upper and lower frame-sections. Extending from the point $d^5$ around the outer and rear sides and fastened to the upper and lower bars $d^3$ $e^3$ $d^4$ $e'$ is sheet-metal incasing material, which operates as a wall around three sides of the chamber. The inner side at the bars $d'$ $e$ is formed of horizontal slats $f$, presenting longitudinal slots or openings $f'$ between them, Fig. 7, the construction being substantially the same as in my aforesaid Letters Patent. The base of the chamber is also formed with a base-plate $E^2$, of cast or wrought metal, provided with a rib on the under side to strengthen it. The plate E' is dished, as shown in Fig. 7, to present a shallow receptacle, the base of which is lined with the wearing-plate $E^3$, forming a track on which the carriers move, as hereinafter explained. On the top frame of the casing is a covering-plate $E^4$, which may be in sections to facilitate its removal when desired. On the top plates $E^4$ of the casing E are bearings $f^2$ for a second drive cross-shaft F. The shaft F is in two abutting lengths connected between the casings by a universal joint F', whereby any slight independent play between the casings will not bind the shaft in its bearings. On the shaft F, between the casings, is a second drive sprocket-wheel $F^2$, geared, by means of a chain $F^3$, with the first drive sprocket-wheel $D^2$. Also on the shaft, between the bearings $f^2$ on each casing, is a beveled gear-wheel $F^4$.

In each casing, just beneath the top plate, is a frame G, consisting of brace-bars G' $G^2$, the longitudinally-extending bar $G^3$, fastened to the brace-bars, and the endless channel-bar $G^4$, hereinafter described, which is also fastened to the brace-bars G' $G^2$.

Extending through an opening in the top plate and a bearing in the bar $G^3$ is a short vertical shaft H, located, as shown, to form the central drive-shaft in the casing. In direct line with the shaft H, toward the front and rear and parallel therewith, are shafts I K. These shafts extend at their upper ends through openings in the top plate, having bearings for their upper ends in the bar $G^3$ and at the lower ends extending into bearings $E^5$ on the plate $E^3$. On the central shaft H, beneath the beveled gear $F^4$ and meshing therewith, is a beveled gear H', and integral with the gear H' is a gear-wheel $H^2$. On the shafts I K, above the plate $E^4$, are gear-wheels I' K', meshing with the gear $H^2$. To- The rotation of the shafts I and K turns the sprocket-wheels $I^2$ $I^3$ $K^2$ $K^3$ and moves the upper and lower chains $I^4$ $K^4$ and carriers L. The gearing is such with relation to the rear drive-wheels C that the speed of travel of the carriers in their movement in the backward direction is approximately equal to the speed of the forward movement of the machine. In the movement of the machine it straddles the row of cotton-plants to be picked, the latter passing between the adjacent sides of the casings E. The engagement of the arms $l$ with the channel guide or race $G^4$ causes the carriers to be translated at opposite ends of their course around the centers formed by the shafts I K, whereby, as in my aforesaid patented machine, the picker-stems on each side are thrust longitudinally into the plants at the forward ends of their backward course, held extended and intermeshed during their prolonged movement in the backward direction, and withdrawn longitudinally from the plants at the rear ends of their backward course. In this movement of the carriers the pinions $h^2$ are rotated by their engagement with the rack M'. This rotation turns the shafts $h$ in the carriers and through the gears $h'$ $i'$ turns the shafts $i$. Through the worm-pinions $i^2$ $k'$ the spindles are rotated on their axes. These spindles are formed with longitudinally-extending series of teeth, which slant in the direction of the free ends of the spindles and gather the cotton from open bolls in the plants. As the spindles are withdrawn from the plants they are drawn longitudinally through stripper mechanisms R, similar in the main to the stripper mechanisms shown in my aforesaid Letters Patent, but differing therefrom in certain details of construction, which form the subject of a separate concurrent application, filed on the 15th day of April, 1901, Serial No. 55,889. The spiked roller R' shown is a feature of the stripping mechanism. The object of this mechanism is to slide the gathered cotton from the spindles longitudinally of the latter and deposit it in a receptacle S, whence it is raised by means of an elevator S' and discharged through the outlet $S^2$. There is an elevator S' extending from the base of each casing E, the elevator belt or apron (not shown in the present drawings) being propelled from a shaft $S^3$, carrying a sprocket-wheel driven by means of a chain $S^4$ from a sprocket-wheel $S^5$ on the respective outer end portion of the shaft F. Journaled upon the top plate of each casing E is a gear-wheel $R^2$, meshing with the gear-wheel K' on one side and with a pinion $R^3$ on the upper end of the shaft of the spiked roller R'.

Extending downward from the ends of the bars G' $G^2$ are arms $G^5$, flanged or turned inward at their lower ends, as shown in Figs. 5 and 7, to support a horizontally-disposed and endless guide-bar T, the inner edge of which is flanged to present a vertical inner surface in a plane parallel with the plane of the edge of the rack-plate M. The plate T is in the plane of the upper chain $I^4$, and its inner vertical face forms a guide for the outer side of said chain to steady it and maintain the pinions $h^2$ in contact with the racked and straight edges of the plate M. The guide T is an important feature of the construction, because it prevents disengagement of the pinions $h^2$ from the rack and aids in preventing axial movement of the spindles while they pass the stripping mechanism.

In the movement of the carriers as the spindles or stems are withdrawn from their extended positions in the plants at the end of their backward course the guide $G^4$, which by the engagement with it of the arms $l$ controls the direction of extent of the picker-stems, necessarily describes a course which is at first nearly parallel with the movement of the carriers around the end of the rack and then turns abruptly to direct the carriers in a straight line while the spindles are drawn through the stripper mechanism. It is found in practice that the engagement simply of the arms $l$ with the race or guide $G^4$ is not sufficient in itself to control and steady the movement of the carriers. For this reason the arms or projections $m$ on the carriers are provided to move in a cam-guide V upon and fastened to the guide T. The cam-guide V has an outer vertical guide-flange V' of the shape shown in Fig. 5.

Upon the pinions $h^2$ and integral therewith are lugs $h^3$, presenting straight edges, as shown, one of which edges is intended to slide against a guide-bar W, fastened upon the rack-plate M along the unserrated edge thereof. The opposite ends of the guide-bar W are rounded slightly. The rounded end, at the point where the lugs first engage it, operates as a cam to insure the proper sliding engagement, and the opposite end of the guide is rounded to insure proper engagement of the pinions $h^2$ with the first teeth of the rack.

This application is one of four simultaneously-filed cases, (Serial Nos. 55,889, 55,890, and 55,891,) all relating to improvements in cotton-harvesters and which in the aggregate form the machine as now provided and contemplated. The present application deals more especially with the improved means for holding, rotating, and advancing the picker stems or spindles and for actuating the various moving parts of the machine. The drawings show as much of the machine as is thought necessary to illustrate these improvements and to make their operation clear.

As in my aforesaid patented machine, the casings E are suspended from the main frame of the machine by rods $y$, threaded at their ends and passing through the internally-threaded hubs of sprocket-wheels $y'$ on the frame. All the sprocket-wheels are connected by an endless chain $y^2$, and on one of them is a hand-wheel $y^3$ near the driver's seat. By turning the hand-wheel both casings may ward the upper end of each of the shafts I K are sprocket-wheels I², K², of the peculiar form shown in Fig. 8, and toward the lower ends of the same shafts are dished (see Fig. 7) sprocket-wheels I³ K³, of the peculiar form shown in Fig. 9. Extending around the upper sprocket-wheels I² K² is a chain I⁴, the links of which are constructed to engage and form bearings for the upper ends of the vertical tubular spindle-carriers L. Extending around the sprocket-wheels I³ K³ is a chain K⁴, every second link of which forms a caster and pivotal bearing for the lower end of a carrier L. The casters run upon the track or plate E³. The carriers L are in the main like those shown in my aforesaid patent, but differ therefrom in details of construction. The body portion of each carrier consists (see Fig. 10) of a casing $g$, provided with a top disk or cap-piece $g'$, rigidly but removably secured thereto. Integral with the top disk is a bearing projection or trunnion having a bearing-surface $g^2$, which passes through and is journaled in the chain I⁴, and a bearing-surface $g^3$. The body of the carrier is in two longitudinal halves or sections, as indicated in Fig. 12, fastened together along one side by bolts $g^4$. The cap-piece $g'$ fits tightly around the upper end of the body portion, as shown in Fig. 10, and at the lower end of the body portion is a tubular projection $g^5$ of small diameter, externally threaded to receive a fastening-ring $g^6$. The cap $g'$, bolts $g^4$, and nut or ring $g^6$ hold the two halves of the body portion securely together, and the end $g^5$ fits over the stud of a caster-link of the chain K⁴. By removing the cap-piece, ring $g^6$, and bolts $g^4$ the sections of the carrier-casing may be separated for access to the interior moving parts when desired. The upper part of the body portion $g$ is circular, as shown in Fig. 11, while below the upper portion it may be angular in cross-section, as shown in Fig. 12. M is an oblong plate with rounded ends, its edge surface being parallel with the plane of the path of the chains I⁴ K⁴. The plate is supported from the bars G' G² and by a central hollow pillar M² and has openings through it for the free passage of the shafts I K and the shaft H, which is journaled therein at its lower end. The edge of the plate along one side and part way across each end is serrated to form a rack M', substantially as in my aforesaid patent. Extending through the trunnion at the top of each carrier is a shaft $h$, terminating just below the top of the carrier-body and there carrying an internally-geared wheel $h'$. On the upper end of the shaft $h$, above the trunnion, is a pinion $h^2$, which meshes with and travels along the rack M'. Journaled in the lower end of the body portion $g$ and also between its ends, if desired, is a vertical shaft $i$, which is at one side of the center of rotation of the carrier and is provided at its top with a pinion $i'$, engaging the internal gear $h'$. Disposed equidistant along the length of the shaft $i$ are worm-pinions $i^2$, which in the present construction are eleven in number. In the horizontal planes of the worm-pinions $i^2$ are flanged openings $g^7$ and $g^8$, located, respectively, in opposite sides of the body portion $g$, as shown in Fig. 12. The flanges of the openings project, as shown, and are externally threaded. Extending across the chamber in the body portion of the carrier at each pair of openings $g^7 g^8$ are sleeves $k$, journaled in said openings and carrying in the chamber worm-pinions $k'$, engaging the worm-pinions $i^2$. In the opening $g^8$ is a socket-piece or bearing-liner $k^2$, which bears against the end of the sleeve $k$ and is held in position by a screw-cap $k^3$, fitting over the flange of the opening $g^8$. Each sleeve $k$ is to receive a removable picker-spindle N. The shank portion of the spindle fits through the sleeve $k$ and into the socket-piece or liner $k^2$ at its extreme end, and on the shank is a short radially-extending pin N', which fits in a socket in the end of the sleeve $k$. The engagement of the pin N' with said socket locks the spindle in the sleeve or hollow shaft against independent rotation therein. Fitting loosely over the spindle and bearing loosely against the sleeve $k$ is a collar $k^4$, held in place by a screw-cap $k^5$, which is screwed upon the flange of the opening $g^7$. When the screw-cap $k^5$ is removed, the spindle may be inserted or withdrawn. When inserted, the butt-end of its shank rotates in the bearing piece or liner $k^2$, and it is firmly fixed to rotate with the sleeve $k$ by the engagement of the pin N' with the socket in the end of the sleeve. It is held against removal from the sleeve by the collar $k^4$. Thus the spindle has a long bearing and is held firmly against lateral play. The channel in the under side of the bar G⁴ forms an endless guide or race, and its general shape and purpose are the same as the guide shown in my aforesaid Letters Patent. Fixed to the bearing-surface $g^3$ of each carrier is a carrier-guide and steadying attachment P, (shown in detail in Fig. 13,) having arms $l m$, the former of which extends spirally upward and carries an antifriction-wheel $l'$, moving in the channel guide or race G⁴. The arm $m$ carries an antifriction-wheel $m'$ for a purpose hereinafter described.

The operation of the parts described is substantially the same as that of the mechanism shown in my aforesaid Letters Patent, the main difference being in the construction of the carriers and construction and disposition of the driving mechanism.

In the forward travel of the machine the gear-wheels C' rotate the pinions D'. When the clutch members $b' c$ on the shaft D are placed in engagement, as before described, the shaft and its sprocket-wheel D² rotate and through the chain F³ rotate the shaft F and bevel-gears F⁴. The bevel-gears rotate the shafts H in opposite directions, and each shaft H rotates the respective shafts I and K in the same direction, as indicated in Fig. 3.

be raised or lowered simultaneously while the machine is moving. To shield the gears C' D', I provide a fixed cover X, of the form shown in Fig. 1, which will prevent soil carried up by the wheels C from dropping upon and clogging the gears. The cover or shield X is fastened to the bracket-bearing $a^4$, though it may be supported in any suitable manner.

Although I have taken pains in the foregoing description to point out the specific nature of the various details and although I prefer to construct the machine with all these details in the form illustrated, I do not intend to limit my invention thereto. It will be quite within the province of the skilled mechanic to change the apparatus in many parts without departing from those particular features which are involved in my invention and which are intended to be protected hereby.

What I claim as new, and desire to secure by Letters Patent, is—

1. In a cotton-harvester, the combination with the main frame and running-gear, of a first drive-shaft, clutch mechanism on the said shaft, clutch-shipping mechanism for throwing said shaft into and out of operative engagement with the running-gear, casings supported in the main frame and adjustable with relation thereto, picker-spindles and their carriers, and propelling gear mechanisms for the carriers in the casings, and a second drive-shaft upon the casings geared to the said first drive-shaft and to the carrier-propelling gear mechanism in both the casings, substantially as described.

2. In a cotton-harvester, the combination with the main frame and running-gear, of a first drive-shaft, casings supported in the main frame, picker-spindles and their carriers, and propelling gear mechanisms for the carriers in the casings, and a second drive-shaft upon the casings geared to the said first drive-shaft and to the carrier-propelling gear mechanisms in both the casings, said second drive-shaft being in sections connected between the casings by a universal joint, substantially as and for the purpose set forth.

3. In a cotton-harvester, the combination of an endless series of picker-spindle carriers, upper and lower endless drive-chains in which the carriers are mounted, forward and rear vertical shafts provided with driving gear-wheels on their upper ends and with upper and lower driving sprocket-wheels for the said chains, and a vertical drive-shaft between the said forward and rear shafts, and a gear-wheel thereon meshing with the gear-wheels on the forward and rear shafts to drive the same, substantially as described.

4. In a cotton-harvester, the combination with an endless series of picker-spindle carriers, upper and lower endless drive-chains in which the carriers are mounted, and forward and rear vertical shafts provided with upper and lower driving sprocket-wheels for the said chains, of gear-wheels on the upper ends of said shafts for driving the same, a central vertical drive-shaft provided at its upper end with a beveled pinion and with a gear-wheel meshing with both the said gear-wheels on the said shafts, a horizontal driving-shaft and a beveled gear thereon meshing with the beveled pinion on the said central drive-shaft to turn the same, substantially as described.

5. In a cotton-harvester, the combination of an endless series of picker-spindle carriers, upper and lower endless drive-chains in which the carriers are mounted, and forward and rear vertical shafts provided with upper and lower driving sprocket-wheels for the said chains, of gear-wheels on the upper ends of said shafts for turning the same, a central gear-wheel engaging both the said gear-wheels on the said shafts, vertical roller R', pinion on said roller, an idle gear-wheel between the said pinion and said rear-shaft-driving gear-wheel, and a horizontal drive-shaft geared to the said central gear-wheel to turn the same, substantially as described.

6. In a cotton-harvester, a picker-spindle carrier having a casing formed of separable longitudinal sections, a removable cap-piece fitting upon and securing the sections together at their upper ends, a bearing projection on the cap-piece, and a ring fitting upon and securing the sections together at their lower ends, substantially as described.

7. In a cotton-harvester, a picker-spindle carrier having a tubular casing formed of longitudinal sections separably secured together and having a circular head portion, provided with a central upward-extending bearing projection, an angular body portion containing transverse spindle-holding sleeves journaled in its opposite sides, and a bearing projection at the lower end of the body portion, substantially as described.

8. In a cotton-harvester, a rotary picker-spindle carrier having a tubular casing provided with upper and lower carrier-bearings in the same vertical plane, a vertical spindle-driving shaft in the casing to one side of the plane of the said carrier-bearings, and spindles journaled in bearings in opposite sides of the said casing and geared to the said vertical shaft between the said bearings, substantially as described.

9. In a cotton-harvester, a picker-spindle carrier having a tubular casing provided with upper and lower carrier-bearings in the same vertical plane, a vertical spindle-driving shaft in the casing to one side of the plane of said carrier-bearings, and transverse spindle-receiving sleeves journaled in bearings in the opposite sides of the casing and geared to the said vertical shaft between the said bearings, substantially as described.

10. In a cotton-harvester, a picker-spindle carrier having a tubular casing provided with upper and lower carrier-bearings in the same vertical plane, a vertical spindle-driving shaft in the casing to one side of the plane of the said carrier-bearings, transverse spindle-receiving sleeves journaled in bearings in opposite sides of the casing, and worm-pinions on the said vertical shaft and sleeves in driving engagement with each other between the said bearings, substantially as described.

11. In a cotton-harvester, a picker-spindle carrier having a tubular casing provided with upper and lower carrier-bearings in the same vertical plane, a shaft extending downward through the upper carrier-bearing and provided with an internally-toothed wheel at its lower end in the upper part of the casing, means for rotating said shaft in the movement of the carrier, a vertical spindle-driving shaft in the casing to one side of the plane of the said carrier-bearings, a pinion on the upper end of said spindle-driving shaft engaging said internally-toothed wheel, and spindle-receiving sleeves journaled in bearings in opposite sides of the casing and geared to the said spindle-driving shaft between said bearings, substantially as described.

12. In a cotton-harvester, the combination with the picker-spindle carriers and driving and turning means therefor, of the cam-guide V adjacent to the path of the carriers at the rear end portion thereof, and projections on the carriers movable in said guide, substantially as and for the purpose set forth.

13. In a cotton-harvester, the combination with picker-spindle carriers and driving and turning means therefor, of a cam-guide V adjacent to the path of the carriers at the rear end portion thereof, and arms $m$ on the carriers having rollers $m'$ movable in the said guide, substantially as and for the purpose set forth.

In testimony whereof I have signed my name to this specification in the presence of two subscribing witnesses.

ANGUS CAMPBELL.

Witnesses:
ALBERT D. BACCI,
WM. B. DAVIES.